United States Patent
Drazan

(10) Patent No.: US 8,485,944 B2
(45) Date of Patent: Jul. 16, 2013

(54) CONTRIBUTION OF ENERGY TO AN INTELLIGENT ELECTRICAL NETWORK THROUGH AN EXERCISE APPARATUS

(76) Inventor: Jeffrey M Drazan, Woodside, CA (US)

(*) Notice: Subject to any disclaimer, the term of this patent is extended or adjusted under 35 U.S.C. 154(b) by 555 days.

(21) Appl. No.: 12/764,117

(22) Filed: Apr. 21, 2010

(65) Prior Publication Data

US 2011/0263384 A1  Oct. 27, 2011

(51) Int. Cl.
*A63B 15/02* (2006.01)
*A63B 71/00* (2006.01)

(52) U.S. Cl.
USPC .................................. 482/2; 482/1

(58) Field of Classification Search
USPC .................................................. 482/2
See application file for complete search history.

(56) References Cited

U.S. PATENT DOCUMENTS

| | | | |
|---|---|---|---|
| 7,156,780 B1 * | 1/2007 | Fuchs et al. | 482/92 |
| 7,560,822 B1 * | 7/2009 | Hoffmann | 290/1 R |
| 2003/0019942 A1 * | 1/2003 | Blossom | 235/492 |
| 2005/0073150 A1 * | 4/2005 | Patel et al. | 290/1 R |
| 2005/0085353 A1 * | 4/2005 | Johnson | 482/110 |
| 2006/0001569 A1 * | 1/2006 | Scandurra | 342/351 |
| 2008/0172328 A1 * | 7/2008 | Ajilian | 705/39 |
| 2009/0011907 A1 * | 1/2009 | Radow et al. | 482/57 |
| 2009/0205695 A1 * | 8/2009 | Makansi | 136/201 |
| 2009/0247366 A1 * | 10/2009 | Frumer | 482/2 |
| 2009/0271336 A1 * | 10/2009 | Franks | 705/500 |
| 2011/0251021 A1 * | 10/2011 | Zavadsky et al. | 482/5 |
| 2011/0279238 A1 * | 11/2011 | Brommer et al. | 340/10.1 |

* cited by examiner

*Primary Examiner* — Loan Thanh
*Assistant Examiner* — Shila Jalalzadeh Abyane
(74) *Attorney, Agent, or Firm* — Raj Abhyanker, P.C.

(57) ABSTRACT

Contribution of energy to an intelligent electrical network through an exercise apparatus is disclosed. In one aspect, an exercise apparatus includes a frame and a movable object coupled to the frame to generate an electrical energy when a mammal applies a force upon the movable object. In addition, the exercise apparatus includes an energy capture mechanism coupled with the movable object and the frame to harness the electrical energy from the movable object. The exercise apparatus also includes an energy transfer mechanism coupled with the movable object and the frame to transfer the electrical energy to an intelligent electrical network. The mammal described herein may be a human, a domesticated animal, a pack animal, and a beast of burden.

19 Claims, 7 Drawing Sheets

| USER 702 | EXERCISE EQUIPMENT 704 | DATE 706 | ENERGY CONTRIBUTED TO INTELLIGENT ELECTRICAL NETWORK 708 | OTHER 710 |
|---|---|---|---|---|
| SARAH | TREADMILL 100A | 5/10/2012 | 40W | RAN 1.5 MILES |
| JOHN | EXERCISE BICYCLE 100B | 5/12/2012 | 100W | PEDALED 3.5 MILES |
| BILL | ELLIPTICAL TRAINER 100C | 5/11/2012 | 25W | WALKED 500 STEPS |
| ... | ... | ... | ... | ... |

TABLE 750

FIGURE 7

CONTRIBUTION OF ENERGY TO AN INTELLIGENT ELECTRICAL NETWORK THROUGH AN EXERCISE APPARATUS

FIELD OF TECHNOLOGY

This disclosure relates generally to the technical field of measuring devices and, in one embodiment, to a method, system and an apparatus of contribution of energy to an intelligent electrical network through an exercise apparatus.

BACKGROUND

Exercise equipment may have been designed to facilitate a variety of exercise motions. For example, a treadmill may allows a mammal (e.g., a person or an animal) to walk or run in place, a stepper machine may allows the mammal to climb in place, a bicycle machine may allows the mammal to pedal in place, and other machines may allow the mammal to skate and/or stride in place.

Furthermore, more advanced exercise equipment have been designed to facilitate relatively more complicated exercise motions and/or to better simulate real life activity. Energy generated through motion of exercise equipment is dissipated in various forms (e.g., heat and/or noise).

SUMMARY

Contribution of energy to an intelligent electrical network through an exercise apparatus is disclosed. In one aspect, an exercise apparatus includes a frame. The exercise apparatus includes a movable object coupled to the frame to generate an electrical energy when a mammal applies a force upon the movable object. In addition, the exercise apparatus includes an energy capture mechanism coupled with the movable object and the frame to harness the electrical energy from the movable object. The exercise apparatus also includes an energy transfer mechanism coupled with the movable object and the frame to transfer the electrical energy to an intelligent electrical network. The term mammal used herein may be used for describing a human, a domesticated animal, a pack animal, and/or a beast of burden.

The intelligent electrical network described herein is a smart-grid network having an ability to load balance the electrical energy across a plurality of nodes. The exercise apparatus may include a battery to temporary store the energy harnessed through the energy capture mechanism while the electrical energy is transported to the intelligent electrical network. In addition, the exercise apparatus may include an energy storage mechanism that includes an electric double-layer capacitor to provide an energy smoothing in a momentary-load condition of the exercise apparatus. The energy storage mechanism may a thin metal film battery utilizing a thin-film printing technology that applies a solid-state lithium polymer through a deposit mechanism directly onto an integrated circuit of the exercise apparatus. The energy storage mechanism may also include a flywheel comprising a mechanical device with a significant moment of inertia used as a storage device of a rotational energy.

Furthermore, the mechanical device described herein resists a change in a rotational speed to steady a rotation of a shaft when a fluctuating torque is exerted on the mechanical device by the mammal serving as a power source, thereby maximizing a mammal-powered energy output efficiency. A waste-heat of the exercise apparatus and the mammal may be captured through the energy capture mechanism through a set of silicon nanowires embedded in the frame of the exercise apparatus. The set of silicon nanowires may capture a heat flowing from a hot side to a cold side of the frame to create a current that is captured and used to supply the intelligent electrical network when processed by the energy transfer mechanism. Also, the set of silicon nanowires and the frame may possess a thermoelectric conversion efficiency of about 3 ZT.

The waste-heat of the exercise apparatus and the mammal-operator may be captured through the electricity generation mechanism through a thermal diode having an efficiency of at least 40 percent of a Carnot Limit of a maximum efficiency through a reduction of a separation between a hot surface and a conversion device of the exercise apparatus. The exercise apparatus as described may include, but not limited to a standard treadmill, a treadwheel, an omnidirectional treadmill, an elliptical trainer machine, a stepper, a cross-trainer machine, an exercise bicycle, a stationary bicycle, and a mini-exercise bicycle. The exercise apparatus may capture energy from an advanced electrical network when the mammal is not operating the exercise apparatus. The intelligent electrical network may power an auxiliary electrical requirement comprising one or more of a television, a computer, a multimedia player, and a display of the exercise apparatus when the energy harnessed through a motion of the mammal interacting with the movable object is not able to sufficiently power an electrical requirement of the exercise apparatus.

In another aspect, a mammal-powered energy generation and transmission system includes an input mechanism adapted to be powered by a mammal-operator to create a mechanical energy. In addition, a mammal-powered energy generation and transmission system includes an electricity generation mechanism coupled with the input mechanism and adapted to convert the mechanical energy to an electrical energy through a generator. The mammal-powered energy generation and transmission system also includes an energy storage mechanism coupled with the electricity generation mechanism and adapted to retain the electrical energy converted by the generator.

The mammal-powered energy generation and transmission system includes a position sensing mechanism coupled with the input mechanism to sense a position of the input mechanism relative to the mammal-operator. The mammal-powered energy generation and transmission system also includes a controller coupled with the electrical generation mechanism, the position sensing mechanism, and the energy storage mechanism, and adapted to control a load on the electricity generation mechanism to maximize a mammal-powered energy output efficiency. In addition, the mammal-powered energy generation and transmission system includes an output mechanism coupled with the input mechanism and the energy storage mechanism. The mammal powered energy generation may be configured to control conversion of the electrical energy to obtain a desired type and level of voltage and current required by an intelligent electrical network. The mammal-powered energy generation and transmission system also includes an energy transfer mechanism coupled with the output mechanism and the energy storage mechanism and adapted to transfer the electrical energy to the intelligent electrical network.

The energy storage mechanism described herein may be an electric double-layer capacitor, a thin metal film battery utilizing a thin-film printing technology, and/or a flywheel. The mammal-powered energy generation and transmission system may be integrated in an exercise apparatus.

In yet another aspect, a system includes an intelligent electrical network having an ability to load balance an electrical energy across a plurality of nodes. In addition, the system includes a plurality of exercise apparatuses electrically coupled with the intelligent electrical network to generate the electrical energy through a movement of mammals mechanically operating the plurality of exercise devices. The system also includes an energy transfer mechanism associated with each of the plurality of exercise devices to transfer the electrical energy to the intelligent electrical network. In addition, the system includes a smart-grid electronics module to display a statistic associated with energy generated through the movement of mammals mechanically operating the plurality of exercise devices on a display associated with the plurality of exercise devices.

The system may include an energy storage mechanism that includes one or more of an electric double-layer capacitor, a lead-acid battery, a Nickel Cadmium (NiCd) battery, nickel metal hydride battery, Lithium-ion (Li-ion) polymer battery, a zinc-air battery, and/or a molten salt battery. The energy storage mechanism may also be a rechargeable lithium-ion battery collectively associated with the plurality of exercise devices.

In a further aspect, a method includes mechanically displacing a movable object when a mammal applies a force upon the movable object. In addition, the method includes generating an electrical energy based on a displacement of the movable object. The method also includes capturing the electrical energy in a battery. The method further includes electrically transferring the electrical energy stored in the battery to an intelligent electrical network.

The method may include calculating an energy generation statistic of the mammal applying the force on the movable object. In addition, the method may include displaying the energy generation statistic on an exercise apparatus. The energy generation statistic may be a quantity of electrical power generated by the mammal operating the exercise apparatus. A mechanical displacement of the movable object may be associated with a normal operation of the exercise apparatus. The method may also include capturing a waste-heat of the exercise apparatus through one or more of a thermal diode and a silicon nanowire embedded in a frame of the exercise apparatus.

Other aspects will be apparent from the following description and the appended claims.

BRIEF DESCRIPTION OF THE VIEWS OF DRAWINGS

Example embodiments are illustrated by way of example and not limitation in the figures of accompanying drawings, in which like references indicate similar elements and in which:

FIG. 7 is a table view illustrating contribution of energy by each user, according to one embodiment.

Other features of the present embodiments will be apparent from accompanying Drawings and from the Detailed Description that follows.

DETAILED DESCRIPTION

Contribution of energy to an intelligent electrical network through an exercise apparatus is disclosed. It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

Figure 1:
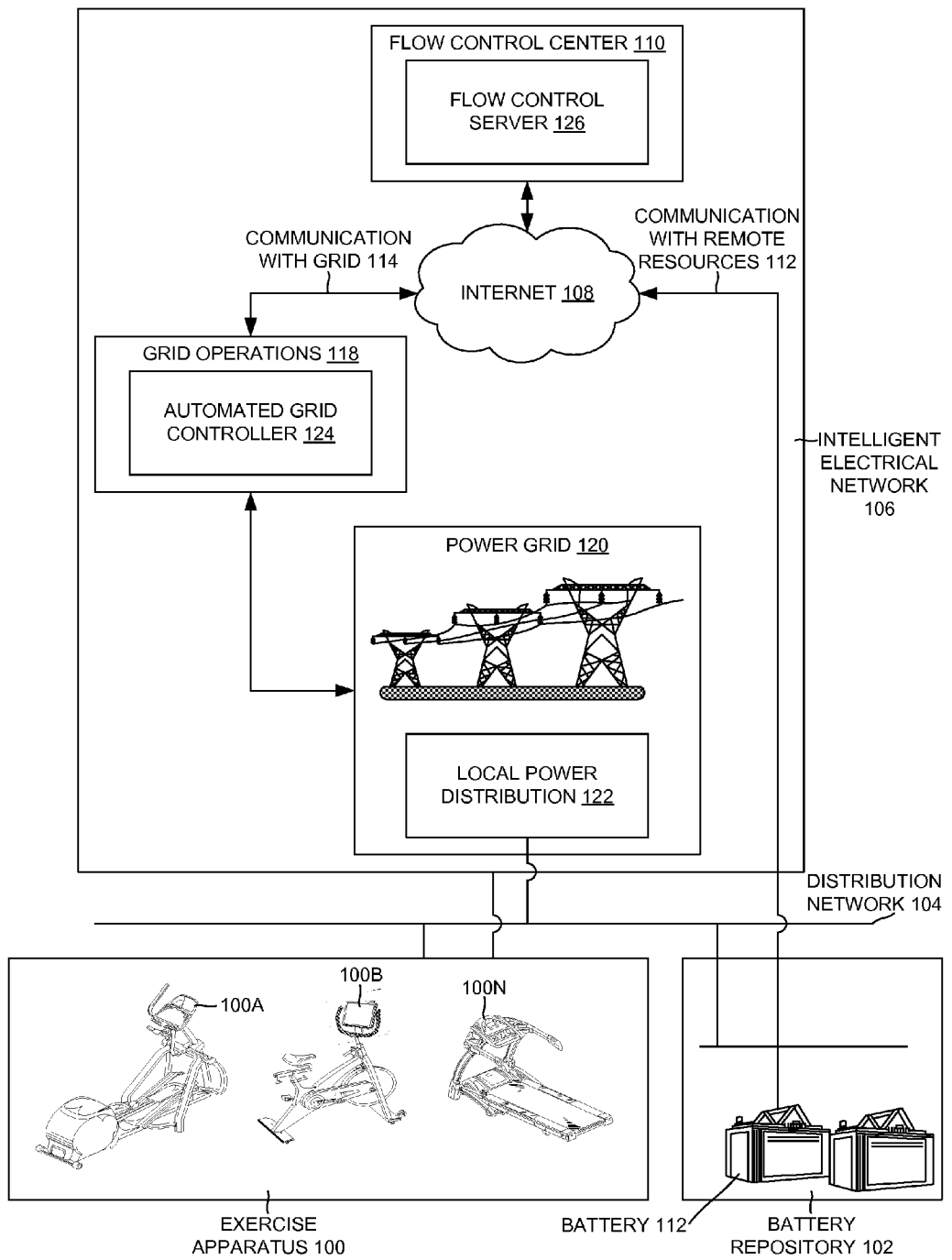
FIG. 1 is a system view illustrating generation of energy using an exercise apparatus and managing the same through an intelligent electrical network, according to one or more embodiments.

FIG. 1 is a system view illustrating generation of energy using an exercise apparatuses 100 and managing the same using an intelligent electrical network 106, according to one or more embodiments. The intelligent electrical network 106 may be a smart-grid network having an ability to load balance the electrical energy across one or more nodes. In one or more embodiments, the intelligent electrical network 106 may be a system that delivers electricity from suppliers to consumers using two-way digital technology to control appliances at consumers' premises to save energy, reduce cost and to increase reliability and transparency. In one or more embodiments, the intelligent electrical network 106 may include an intelligent monitoring system (e.g., sensors, intelligent meters, etc.) that keeps track of all electricity flowing in the system. In one or more embodiments, the intelligent electrical network 106 may incorporate the use of superconductive transmission lines for less power loss, as well as the capability of integrating alternative sources of electricity derived from solar energy and wind energy. In addition, in one or more embodiments, the intelligent electrical network 106 may enable certain selected home appliances such as washing machines or factory processes that can run at arbitrary hours when the power is less expensive or availability is more. In alternative embodiments, the intelligent electrical network 106 may turn off selected appliances to reduce demand. The nodes may be different locations of energy distribution. Each node may have different requirements and demands for power. For example, a node supplying an energy to a city may have a larger requirement and demand for energy, whereas a node supplying energy to a village may have less requirements and demands. The intelligent electrical network 106 may have an ability to load balance the electrical energy across the nodes.

In other words, the intelligent electrical network 106 may "broadcast" energy from a few central energy generators to a large number of users. The intelligent electrical network 106 has a capability of routing energy in more optimal ways to respond to a very wide range of conditions, and to charge a premium to those who use energy at peak hours. Also, the intelligent electrical network 106 described herein may possess capabilities to analyze the incoming energy from energy generating units (e.g., includes suppliers), the amount of stored energy, the energy consumption, distribution and demand chain to manage the energy resources. In addition, in one or more embodiments, the intelligent electrical network 106 described herein is designed to statistically analyze a supply and demand process and other parameters such as peak power production, peak power consumption, peak demand, deficient periods, etc. In one or more embodiments, based on historical data, statistics, and other parameters, the intelligent electrical network 106 may manage the power requirements of consumers over a period of time.

In one or more embodiments, the conditions to which the intelligent electrical network 106, may track and respond to possible conditions occurring during the power generation, and distribution for managing energy demands. Events may occur generally in the environment (e.g., reduction in incoming solar power, etc.), commercially in the power supply market (e.g., prices to meet a high peak demand), locally on the distribution grid (e.g., MV transformer failure requiring a temporary shutdown of one distribution line) or in the home (e.g., someone leaving for work, putting various devices into hibernation, data ceasing to flow to an IPTV), which motivates a change to power flow. The intelligent electrical network 106 may be configured to takes all the conditions in addition to unknown or unexpected conditions, scenarios and for managing energy requirements accordingly.

The intelligent electrical network 106 may be implemented using an internet network 108, a flow control center 110, a power grid 120, a local power distribution module 122, an automated grid controller 124 and a flow control server 126, according to one or more embodiments. The intelligent electrical network 106 may obtain energy input from various sources such as large scare suppliers and from individual users.

In one or more embodiments, the consumer may also provide power input to the intelligent electrical network 106 using the exercise apparatuses 100. Efforts by the mammal while exercising on the exercise apparatus 100 may be utilized for generation of energy. For example, a user running on the tread mill may run a generator by which energy can be generated (e.g., principle of bicycle dynamo). The generation of power and management of the generated power may be elaborated in the forthcoming figures.

The generated power from the exercise apparatuses 100 may be stored using an energy storage mechanism provided thereof. In one or more embodiments, the generated energy may be stored in a battery repository 102 through a distribution network 104. The battery repository 102 may include a host of batteries 112 used for storing energy. Excessive energy or any power overflow in the battery repository 102 may be transferred to the local power distribution module 122. In alternate embodiments, the generated energy from the exercise apparatuses 100 may be distributed for local consumption through the local power distribution module 122. Excessive energy generated in certain cases may be transferred to other locations for distribution through the power grid 120. The power grid 120 is controlled as per grid operations 118 using the automated grid controller 124 configured and controlled from the flow control center 110. The flow control center 110 may include a flow control server 126 that manages and controls the grid operations 118 through a network, preferably through the internet 108. In alternate embodiment, the grid operations 118 may also be controlled through telecommunication networks (e.g., mobile network) by communicating to a communication and control device coupled to the automated grid controller 124. The automated grid controller 124 may include communication ports that are interfaced with appropriate communication and control device to enable communication with the flow control center 110. Similarly, the state of the battery repository 102 and/or the power levels in the battery repository 102 may be monitored and controlled by the flow control server 126 through the network (e.g., the internet 108). In one or more embodiments, the flow control server 126 described herein may include all the software and firmware required to manage the intelligent electrical network 106.

Figure 2:
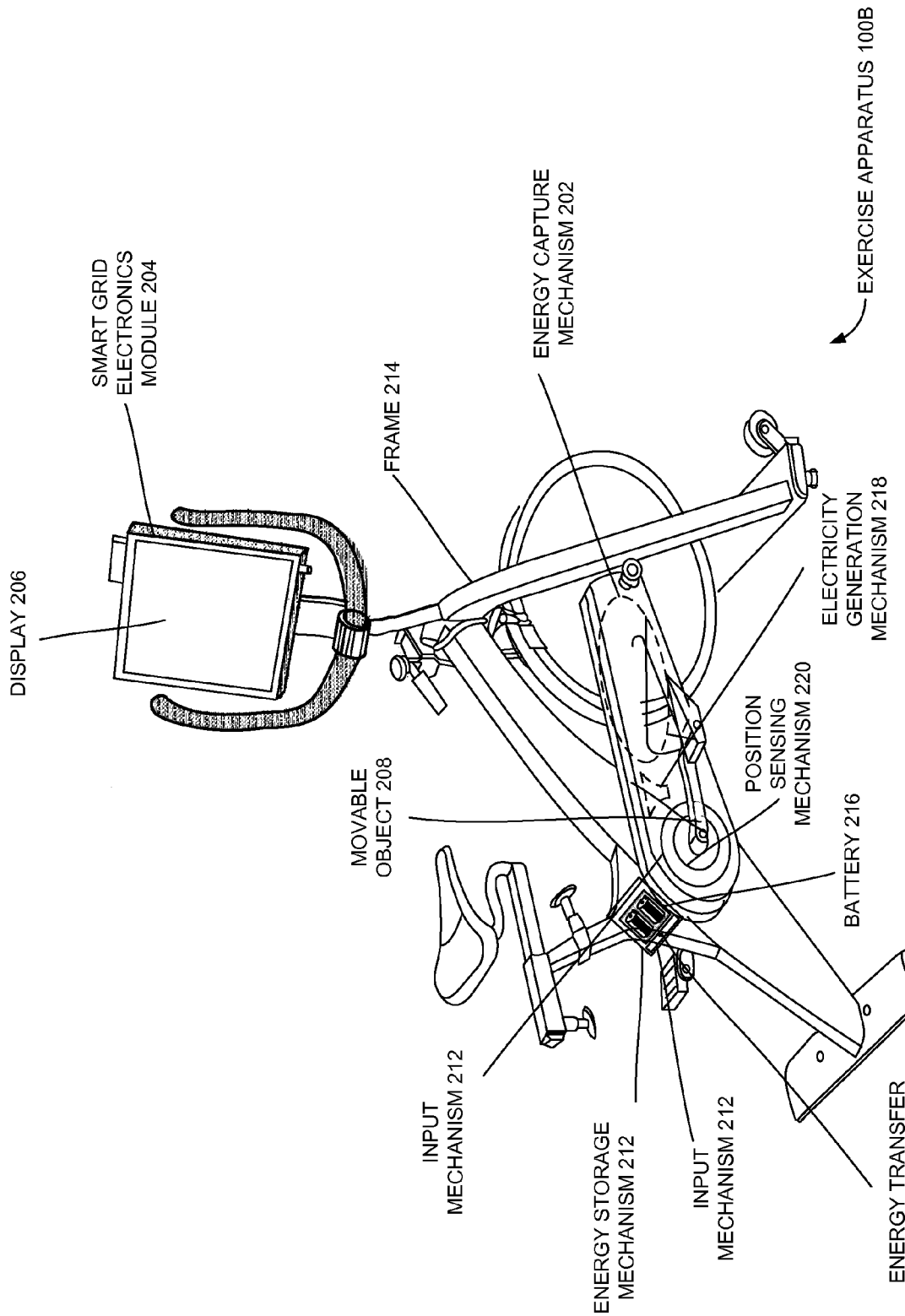
FIG. 2 is the schematic view of the exercise apparatus that is used for generation of energy, according to an example embodiment.

FIG. 2 is the schematic view of the exercise apparatus 100B that is used for generation of energy, according to an example embodiment. The exercise apparatus 100B illustrated in the figure includes an energy capture mechanism 202, smart-grid electronics module 204, a display 206, a movable object 208, energy transfer mechanism 210, and an energy storage mechanism 212, batteries, 216, input mechanism 222, output mechanism 224, and position sensing mechanism 220, according to one embodiment. FIG. 2 in particular illustrates an exercise bicycle frame as the exercise apparatus 100B. The exercise bicycle may be a special-purpose exercise machine in a frame 214 resembling a bicycle without true wheels used for indoor exercising. However, the purpose of the exercise bicycle illustrated herein is for generating energy, in addition to meet the exercise requirement of a user (or mammal). The exercise bicycle (e.g., stationary bicycle or the exercise apparatus 100B) illustrated herein may be designed in a frame that includes interalia, a saddle, pedals, a mechanical assembly, energy generation mechanisms and some form of handlebars arranged as on a bicycle, but used as exercise equipment rather than transportation.

In alternate embodiments, an ordinary bicycle may also be adapted for stationary exercise by placing the bicycle on bicycle rollers or a trainer. The rollers and trainers for the ordinary bicycle are often used by racing cyclists to warm up before racing, or to train on their own machines indoors. In an other alternate embodiment, mini exercise bicycle may also be used as the exercise apparatus 100B for exercise and for simultaneously generating energy. However, the energy mechanism remains the same or with slight modifications.

Figure 3:
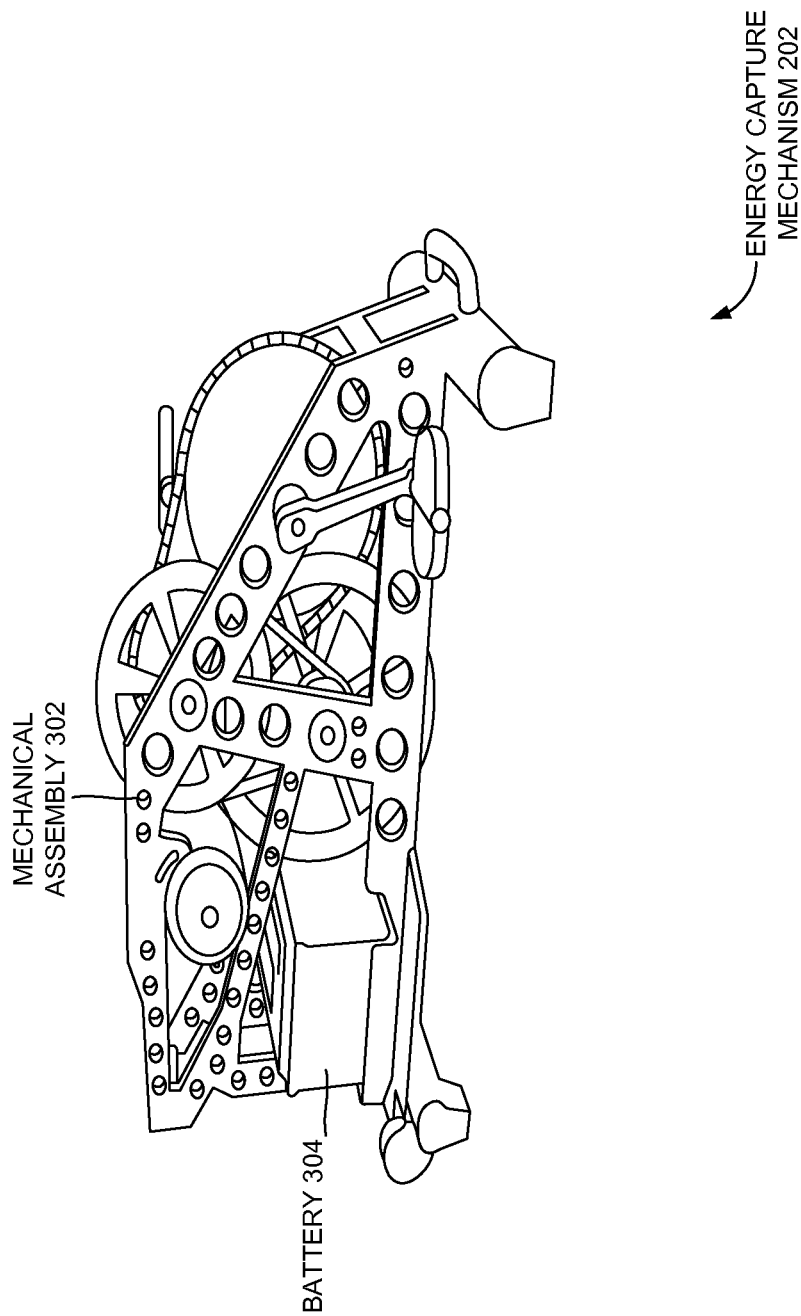
FIG. 3 is a schematic view illustrating an energy capture mechanism, according to an example embodiment.

The exercise bicycle may include the movable object 208 such as the pedal coupled to the frame 214 to generate an electrical energy when the user applies a force on the pedal to simulate a cycling motion. The movable object 208 may have various friction levels for performing a motion using an input mechanism 222. For example, the user may set the less friction to pedal easily for warm up and later on increase friction for more strenuous exercise. Friction may be set by the user using a device provided thereof. The increase or decrease of friction may be due to change mechanical arrangement of the moving object. A mechanical energy may be generated by mechanically displacing the movable object 208 when a mammal (e.g., user) applies a force upon the movable object 208. The movable object 208 and the associated mechanical parts are coupled to the energy capture mechanism 202 that generates energy by converting the mechanical energy into an electrical energy. The energy capture mechanism 202 may be generate electrical energy by running generators coupled to the moving objects through gears or by belt drives or any other means provided thereof. However, the method of conversion may vary as per design and space requirements. FIG. 3 illustrates an example embodiment of the energy capture mechanism 202 that may be used for conversion process. A mechanical assembly 302 (e.g., a part of the input mechanism 222) illustrated in FIG. 3 resists a change in a rotational speed to steady a rotation of a shaft when a fluctuating torque is exerted on the mechanical assembly 302 by the mammal serving as an energy source, thereby maximizing mammal-powered energy output efficiency. According to one embodiment, the mechanical assembly 302 resists a change in a rotation speed (e.g., due to pedaling) to steady a rotation of a shaft when a fluctuating torque is exerted through the pedal on the mechanical assembly 302 by the mammal serving as a power source. The energy generated herein may be stored in a battery 304.

Furthermore, heat generated by the user (e.g., mammal-operator) and/or due to friction may also be used for generation of energy by appropriate means. According to one embodiment, the energy capture mechanism 202 may capture the heat generated from the mammal-operator and/or from the mechanical assembly 302 through a thermo electric converters provide thereof. Preferably, a set of silicon nanowires embedded in the frame 214 of the exercise apparatus 100B may be used as thermo electric converter for conversion of heat into electricity. The silicon nanowires may be placed at appropriate points to capture heat and convert the heat energy to electrical energy (e.g., current). The silicon nanowires are preferred as compared to bismuth telluride and other materials because of good figure of merit (ZT). Moreover, the availability of silicon is abundant, manufacturing cost is cheap, and the process can be easily handled. Also, it has been already proven that the thermal conductivity of the silicon can be decreased and the conversion efficiency (e.g., heat to current) may be increased by growing the material into nanowires with diameters of 10 to 100 nanometers and introducing defects in the silicon that slows the flow of phonons, the acoustic vibrations in the crystal lattice of a material that carry heat.

ZT or the figure of merit may be calculated using the equation:

$$ZT = \frac{\alpha^2 T\alpha}{\rho\lambda};$$

where '$\alpha$' is a seebeck coefficient; '$\rho$' is thermal conductivity; '$\lambda$' is electrical conductivity; $T_\alpha$ is an average sample temperature. The figure of merit (ZT) is a dimensionless quantity. According to one embodiment, the set of silicon nanowires figure of merit (ZT) and the frame 214 has a thermoelectric conversion efficiency around 3 ZT. The set of silicon nanowires captures a heat flowing from a hot region to a cold region of the frame 214 to create a current. The generated current may be then temporarily stored in a battery 216 provided thereof using the energy capture mechanism 202. Also, the current generated may be processed and transported to the intelligent electrical network 106 in an appropriate form using the energy transfer mechanism 210. The energy transfer mechanism 210 may be coupled with the movable object, the energy storage mechanism 212, and/or the energy capture mechanism 202 of the frame 214 to transfer the electrical energy to the intelligent electrical network 106.

In one or more embodiments, the energy may be communicated to the intelligent electrical network 106 through a set of wires provided thereof or through displaceable battery. The battery 216 may temporarily store the energy harnessed through the energy capture mechanism 202 while the electrical energy is in transport to the intelligent electrical network 106. In one or more embodiments, the battery may be include, but not limited to a rechargeable lead-acid battery, a rechargeable NiCd battery, nickel metal hydride battery, Li-ion polymer battery, a zinc-air battery, and a molten salt battery.

In alternate embodiments, the waste-heat of the exercise apparatus 100B and the mammal-operator may be captured through the electricity generation mechanism 218 using a thermal diode (not shown in figure) having an efficiency of at least 40 percent of a Carnot Limit of a maximum efficiency through a reduction of a separation between a hot surface and a conversion device of the exercise apparatus. The thermal diodes may be placed at appropriate places for generating electricity. The hot surfaces may be generally located near the mechanical assembly, the mammal-operator physical contact locations, etc.

Figure 6:
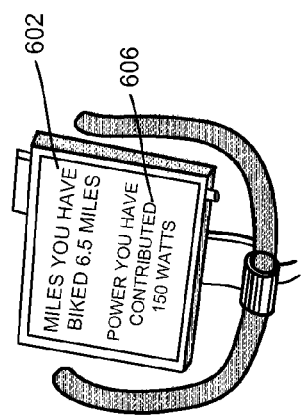
FIG. 6 is a schematic view illustrating a statistic report being displayed on a display, according to one example embodiment.

Furthermore, the exercise apparatus 100B may also include a display 206 and a smart-grid electronics module 204. The display 206 may provide information to the user about the time, effort, distance covered, energy generated and the like (e.g., illustrated in distance covered 602 and power contribution 606 of FIG. 6). In addition, with help of additional equipments, the display 206 may be configured to display additional information such as heart beat rate, number of calories expended, step count, blood pressure, etc. In one or more embodiments, the exercise apparatus 100B may also include an ergometer to measure the work done. The ergometer may be digitized and coupled to the display 206 for providing a measurement reading. Furthermore, an energy generation statistic of the mammal may be calculated over a period of time. The energy generation statistic generated may be displayed on the display 206. It should be noted that the energy generation statistic may be a quantity of electrical power generated by the mammal operating the electrical apparatus. The mechanical displacement of the movable object may be associated with a normal operation of the electrical apparatus.

The smart-grid electronics module 204 may track energy generated in the exercise apparatus 100B, energy consumed, energy requirements, etc. In one or more embodiments, a part of energy generated may be used for the requirements of the exercise equipment and rest may be communicated to the intelligent electrical network 106. Alternatively, if the energy generated is low and the exercise apparatus 100B requires energy, the energy may be supplied from the intelligent electrical network 106 to power an auxiliary electrical requirement that includes one or more of a television, a computer, a multimedia player, and the display 206 of the exercise apparatus 100B when the energy harnessed through the motion of the mammal interacting with the movable object 208 is not able to sufficiently power an electrical requirement of the exercise apparatus 100B. Furthermore, the exercise apparatus 100B captures energy from the intelligent electrical network 106 when the mammal (e.g., human being, animal or a beast of burden) is not operating the exercise apparatus or at idle times.

Furthermore, the exercise apparatus 100 may include the energy storage mechanism 212 to store and transmit energy through the energy transfer mechanism 210. In one or more embodiments, the energy storage mechanism 212 may include one or more of an electric double-layer capacitor, a thin metal film battery, a flywheel, etc. The electric double-layer capacitor (e.g., supercapacitors, electrochemical double layer capacitors (EDLCs), or ultracapacitors) may provide an energy smoothing in a momentary-load condition of the exercise apparatus. The electric double-layer capacitor may be preferred due to ability of the EDLC to store energy quickly compared to conventional battery. In addition, the electric double-layer capacitor has high unusually high energy density when compared to common capacitors. The energy storage mechanism 212 may be a thin metal film battery utilizing a thin-film printing technology that applies a solid-state lithium polymer through a deposit mechanism directly onto an integrated circuit of the exercise apparatus. Thin-film printing technology may apply solid-state lithium polymers to a variety of substrates to create unique batteries for specialized applications. Thin-film batteries may be deposited directly onto chips or chip packages in any shape or size. Flexible thin film battery can be made by printing onto plastic, thin metal foil, or paper and the flexible thin film battery may be placed at appropriate place in the exercise apparatus 100.

The flywheel of the energy storage mechanism 212 is a mechanical device with a significant moment of inertia may be used as a storage device of a rotational energy. The generated current is then captured and used for supplying to the intelligent electrical network 106 when processed by the energy transfer mechanism 210. The flywheel coupled to the movable object 208 may resist changes in their rotational speed, which helps steady the rotation of the shaft when a fluctuating torque is exerted on it (e.g., illustrated in FIG. 3). The flywheels produce very high power pulses.

It should be noted that the exercise apparatus 100B should not be limited to bicycle, but similar exercise apparatus can also be used for generating energy such as omnidirectional treadmill, a standard treadmill, a treadwheel, an elliptical trainer machine, and a stepper, or any other mammal exercising machine.

The omnidirectional treadmill, or ODT, may be a device that allows a person to perform locomotive motion in any direction. The ODT provides a user with an ability to move in any direction as compared to traditional treadmills. The omnidirectional treadmills are employed in immersive virtual environment implementations to allow unencumbered movement within the virtual space through user self-motion. The ODT user will able to accelerate away from center of the surface. The system recognizes this using a variety of sensing means, and gently accelerate the user back towards the center. The energy is generated from the user motion.

The elliptical trainer may be a stationary exercise machine used to simulate walking or running without causing excessive pressure to the joints, hence decreasing the risk of impact injuries. The elliptical trainers are primarily driven via the legs, and most are combination designs having handle-levers attached to each pedal-link for the purpose of enabling a burden on the arms to provide a secondary source of driving power. The energy here may be generated by user's motion using pedals.

Figure 4:
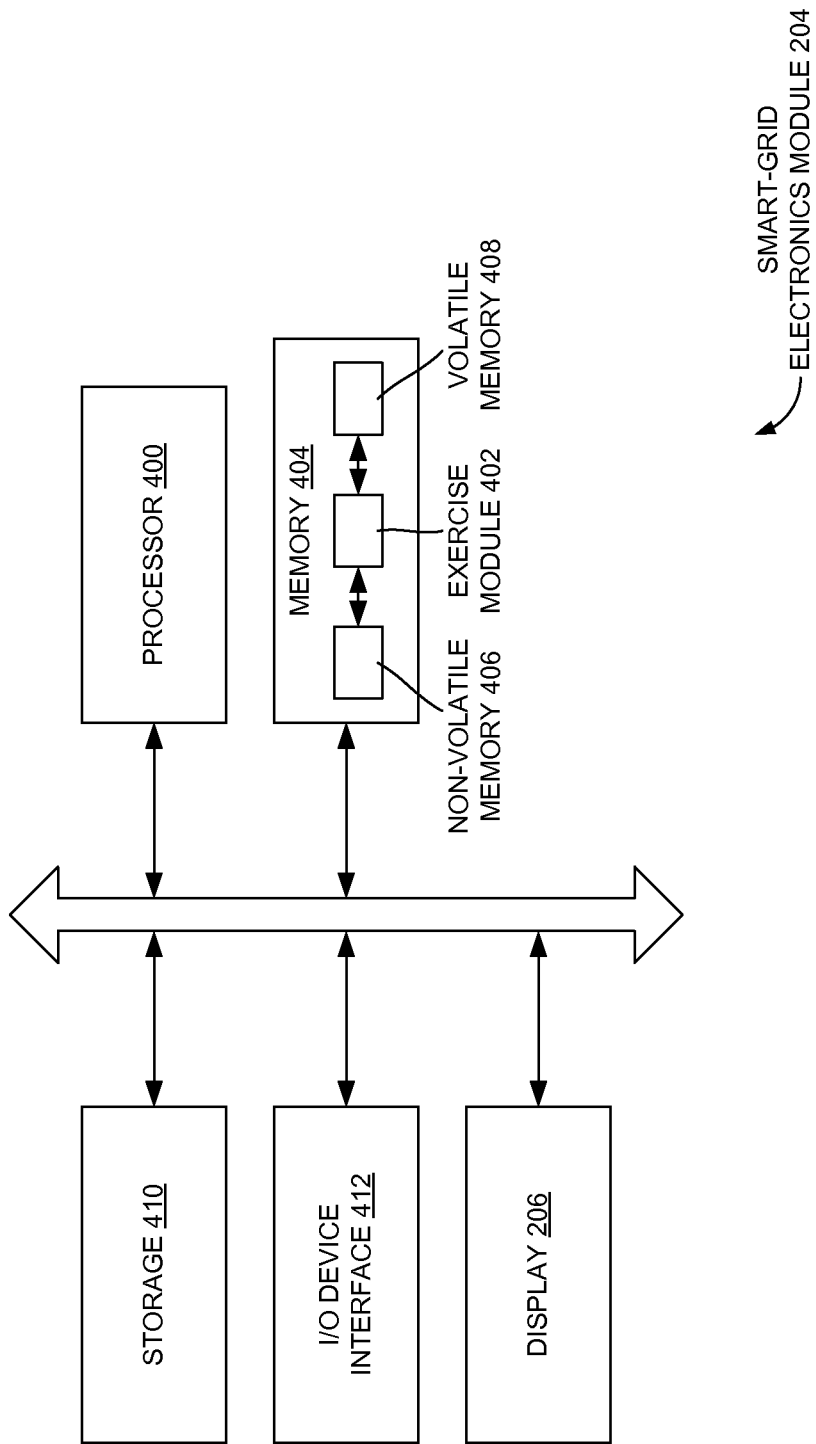
FIG. 4 is a schematic view of a smart-grid electronics module illustrated in FIG. 2, according to one or more embodiments.

FIG. 4 is a schematic view of the smart-grid electronics module 204 illustrated in FIG. 2, according to one or more embodiments. The smart-grid electronics module 204 is a hardware supported by software for managing energy resources in the exercise apparatuses. The smart-grid electronics module 204 may include a controller 400, a memory 404, an exercise module 402, a non-volatile memory 406, a volatile memory 408, a storage 410, and 110 device interface 412, according to one embodiment. The exercise module 402 may offer variety of modes to exercise. For example, the user may set the exercise apparatus motion with high friction to perform strenuous exercise or with low friction to perform warm up exercise or to move forward, backwards, etc. The exercise module 402 may enable the user to set the preferences for performing exercise. The memory 404 may include the exercise module 402, the non-volatile memory 406 and the volatile memory 408. The volatile memory 408 may be used for internal purposes such as the loading the system mode, configurations, etc. The non-volatile memory 406 may be used to store additional data such as logs, readings, reports, etc. The I/O device interface 412 may provide interfaces for communication with external devices. For example, a user may connect a heartbeat monitor to the apparatus, the smart-grid electronics module 204 senses the coupled heart beat monitor and uploads the respective drivers immediately to display reading on the display 206. The display 206 here is an integrated part of the exercise apparatus 100B. Alternatively, the output device may also include a computer, or any data processing device for the purpose of data analysis. The storage 410 may be an energy storage unit.

The smart-grid electronics module 204 may monitor the energy in the exercise equipment. In one or more embodiments, there may be various energy storage areas (e.g., temporary batteries, storage batteries, etc.), the energy in those storage are monitored by the smart-grid electronics module 204. Furthermore, the smart-grid electronics module 204 may also have other programs for monitoring power requirements of the device, the power output, tracking power input, flow of power, etc. In one or more embodiments, the smart-grid electronics module 204 may calculate an energy generation statistic of the mammal applying the force on the movable object 208. The calculated statistic may be displayed on the display 206. In one or more embodiments, the smart-grid electronics module 204 may also be coupled to the flow control server 126 for providing data such as power consumption, power output, etc.

Figure 5:
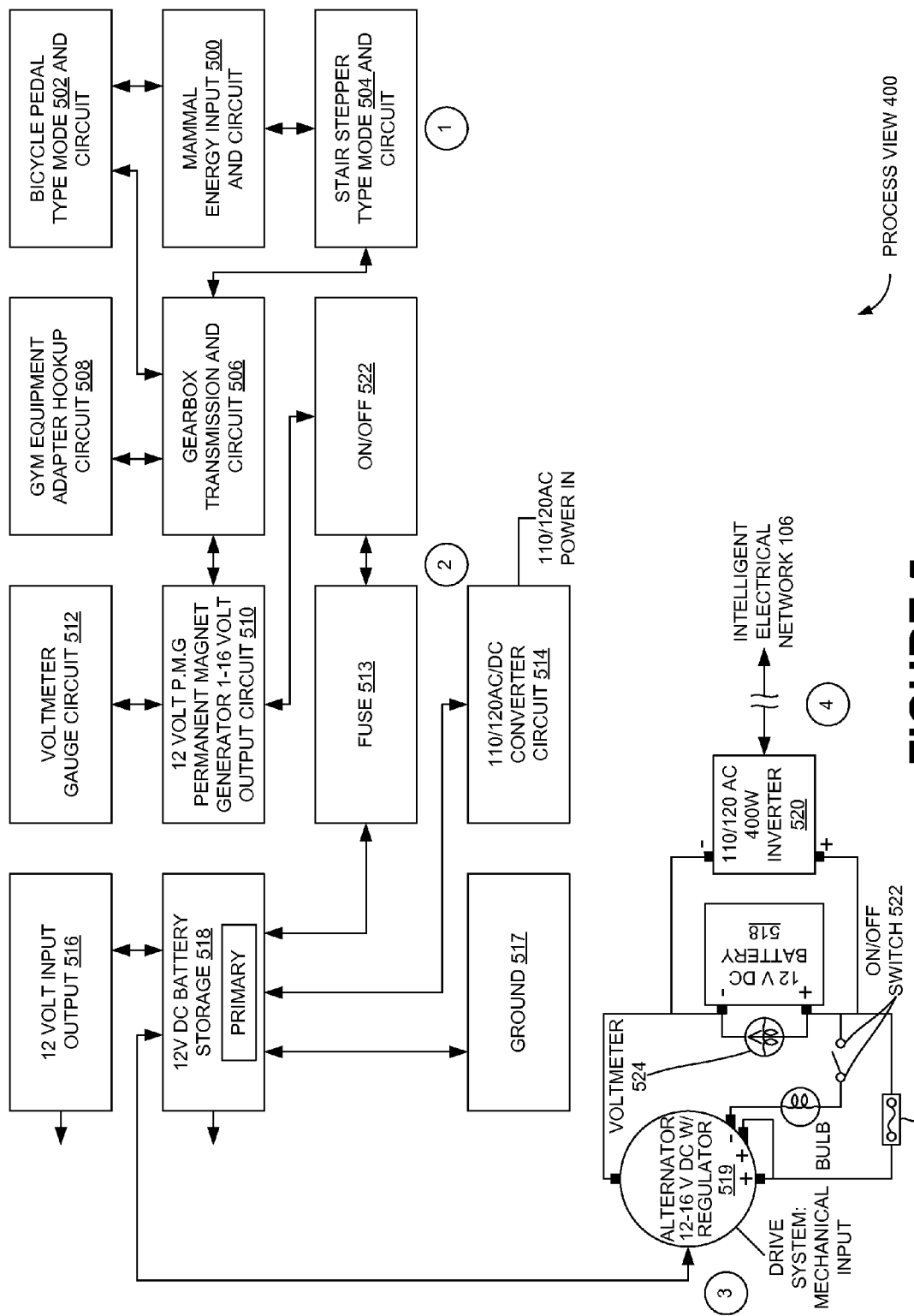
FIG. 5 is a schematic view illustrating a process of generating energy, according to one example embodiment.

FIG. 5 is a schematic view illustrating a process of generating energy, according to one example embodiment. In particular, FIG. 5 illustrates pictorial process flow of generating energy, according to one embodiment. In step 1, an input mechanism through a mechanical input may be adapted to be powered by a mammal operator to create a mechanical energy. The mechanical input may be provided by applying torque (e.g., using the bicycle pedal type mode 502), or pressure (e.g., the mammal energy input 500) or user movement (e.g., stair stepper type mode 504) or through any other means to generate mechanical energy. The mechanical energy in a form of force/torque may be transferred to the gearbox transmission 506 as in step 2. In one or more embodiments, the gearbox transmission 506 may be provided with a gym equipment adapter hookup circuit 508 to provide an optional input electricity to drive the mechanical inputs (e.g., bicycle pedal, stair stepper, etc.). The electricity generation mechanism 218 may be coupled with the input mechanism (e.g., movable object or the gear box transmission) and adapted to convert the mechanical energy (e.g., force, or torque) to an electrical energy through a generator. In one or more embodiments, the mechanical energy generated in form of force/torque may be transferred to the 12 Volt permanent magnet generator 510 (e.g., through belt systems or gear systems) that converts mechanical energy to electrical energy to generate 1-16 Volts output. The output may be observed in the voltmeter gauge circuit 512. The energy storage mechanism 212 coupled with the electricity generation mechanism 218 (e.g., permanent magnet generator 510) may be adapted to retain the electrical energy converted by the permanent magnet generator 510.

In one or more embodiments, the generated voltage may be communicated to the multiple 12V Direct Current (DC) battery storage 518 (e.g., primary storage) through a switch 522 and fuse 513 by converting the Alternating Current (AC) to DC (e.g., using rectifiers, etc.). The position sensing mechanism 220 coupled with the input mechanism 222 may sense a position of the input mechanism relative to the mammal operator (e.g., user position). The controller 400 coupled with the electricity generation mechanism 218, the position sensing mechanism 220, and the energy storage mechanism 212, may be adapted to control a load on the electricity generation mechanism 218 to maximize a mammal-powered energy output efficiency. Furthermore, an output mechanism 224 coupled with the input mechanism 222 and the energy storage mechanism 212 may be adapted to control conversion of the electrical energy to obtain a desired type and level of voltage and current required by an intelligent electrical network 106. The fuse 513 may be used for protection of the circuits by preventing any spikes or high voltage energy flow. Any excess energy or spikes may be sent to ground 517. The energy stored in the battery storage 518 may be used for various domestic purposes by powering the devices through a 12 Volt input/output 516. Alternatively, the energy transfer mechanism 210 coupled with the output mechanism 224 and the energy storage mechanism 212 may be adapted to transfer the electrical energy to the intelligent electrical network 106 by appropriate means.

In case of low energy, the 12V DC battery storage 518 may be charged through an input obtained from the converter circuit 514. In step 3, the mechanical energy generated by running a drive system may be converted to an electrical energy using an alternator 519 and then converted to 12-16V DC using a rectifier (or by any other means). Furthermore, the generated 12-16V DC may be converted into an AC voltage using an inverter 520 and required energy/power in a required form may be transferred to the intelligent electrical network 106 in step 4.

FIG. 7 is a table view 750 illustrating contribution of energy associated with the user, according to one embodiment. A user field 702 may provide a name of the user. An exercise equipment field 704 may illustrate the exercise equipment used. A date field 706 may illustrate a date of exercise performed. An energy contributed to intelligent electrical network 708 field illustrates amount of energy contributed by a particular user. The other field 710 may illustrate various other matters such as distance travelled, calories burnt, etc. In one example embodiment, a second row illustrates Sarah in the user field 702 who uses treadmill as the exercise apparatus 100A as illustrated in exercise equipment field 704, contributed 40 Watt as illustrated in energy contributed to the intelligent electrical network field 708, on May 10, 2012 as illustrated in date field 706, by running 1.5 miles as illustrated in the other field 710. Similarly, third row illustrates a user John who used an exercise bicycle as the exercise apparatus 100B, contributed 100 Watts of energy by pedaling 3.5 miles on May 12, 2012 and so on.

Although the present embodiments have been described with reference to specific example embodiments, it will be evident that various modifications and changes may be made to these embodiments without departing from the broader spirit and scope of the various embodiments. Accordingly, the specification and drawings are to be regarded in an illustrative rather than a restrictive sense.

What is claimed:

1. An exercise apparatus, comprising:
    a frame;
    a movable object coupled to the frame to generate electrical energy when a mammal applies a force upon the movable object;
    an energy capture mechanism coupled with the movable object and the frame to harness the electrical energy from the movable object, the energy capture mechanism also being capable of harnessing electrical energy from at least one of heat generated by the mammal and heat due to friction based on work done on the exercise apparatus; and
    an energy transfer mechanism coupled with the movable object and the frame to transfer the electrical energy harnessed to an intelligent electrical network;
    wherein the energy capture mechanism includes a plurality of wires embedded in the frame to convert the heat into electrical energy, the plurality of wires being a set of silicon nanowires configured to capture heat flowing from a hot side to a cold side of the frame to create a current that is captured and used to supply the intelligent electrical network when processed by the energy transfer mechanism.

2. The exercise apparatus of claim 1, further comprising an energy storage mechanism including a flywheel comprising a mechanical device with a significant moment of inertia used as a storage device of a rotational energy.

3. The exercise apparatus of claim 2, wherein the mechanical device is configured to resist a change in a rotational speed to steady a rotation of a shaft when a fluctuating torque is exerted on the mechanical device by the mammal serving as a power source, thereby maximizing a mammal-powered energy output efficiency.

4. The exercise apparatus of claim 3, wherein the set of silicon nanowires and the frame has a thermoelectric conversion efficiency of at least 3ZT.

5. The exercise apparatus of claim 1, wherein the intelligent electrical network is a smart-grid network having an ability to load balance the electrical energy across a plurality of nodes.

6. The exercise apparatus of claim 1, further comprising a battery to temporary store the electrical energy harnessed through the energy capture mechanism while the electrical energy is transported to the intelligent electrical network.

7. The exercise apparatus of claim 1, further comprising an energy storage mechanism comprising an electric double-layer capacitor to provide energy smoothing in a momentary-load condition of the exercise apparatus.

8. The exercise apparatus of claim 1, further comprising an energy storage mechanism comprising a thin metal film battery utilizing a thin-film printing technology that applies a solid-state lithium polymer through a deposit mechanism directly onto an integrated circuit of the exercise apparatus.

9. The exercise apparatus of claim 1, wherein the heat of the exercise apparatus and the mammal are captured through the electricity generation mechanism through a thermal diode having an efficiency of at least 40 percent of a Carnot Limit of a maximum efficiency through a reduction of a separation between a hot surface and a conversion device of the exercise apparatus.

10. The exercise apparatus of claim 1,
    wherein the exercise apparatus is at least one of a standard treadmill, a treadwheel, an omnidirectional treadmill, an elliptical trainer machine, a stepper, a cross-trainer machine, an exercise bicycle, a stationary bicycle, and a mini-exercise bicycle,
    wherein the exercise apparatus captures energy from an advanced electrical network when the mammal is not operating the exercise apparatus,
    wherein the intelligent electrical network is configured to power an auxiliary electrical requirement comprising at least one of a television, a computer, a multimedia player, and a display of the exercise apparatus when the electrical energy harnessed through a motion of the mammal interacting with the movable object is not able to sufficiently power an electrical requirement of the exercise apparatus, and
    wherein the mammal is at least one of a human, a domesticated animal, a pack animal, and a beast of burden.

11. A mammal-powered energy generation and transmission system, comprising:
    an input mechanism associated with an exercise apparatus adapted to be powered by a mammal-operator to create mechanical energy;
    an electricity generation mechanism coupled with the input mechanism and adapted to convert the mechanical energy to electrical energy through a generator, the electricity generation mechanism also being capable of harnessing energy from at least one of heat generated by the mammal-operator and heat due to friction based on work done on the exercise apparatus and convert the harnessed energy to electrical energy;

an energy storage mechanism coupled with the electricity generation mechanism and adapted to retain the electrical energy converted by the generator;

a position sensing mechanism coupled with the input mechanism to sense a position of the input mechanism relative to the mammal-operator;

a controller coupled with the electrical generation mechanism, the position sensing mechanism, and the energy storage mechanism, and adapted to control a load on the electricity generation mechanism to maximize a mammal-powered energy output efficiency;

an output mechanism coupled with the input mechanism and the energy storage mechanism and adapted to control conversion of the electrical energy to obtain a desired type and level of voltage and current required by an intelligent electrical network; and an energy transfer mechanism coupled with the output mechanism and the energy storage mechanism and adapted to transfer the electrical energy to the intelligent electrical network;

wherein the heat of the exercise apparatus and the mammal-operator are captured through the electricity generation mechanism through a set of silicon nanowires embedded in a frame of the exercise apparatus, and wherein the set of silicon nanowires is configured to capture a heat flowing from a hot side to a cold side of the frame to create a current that is captured and used to supply the intelligent electrical network through the energy transfer mechanism.

12. The mammal-powered energy generation and transmission system of claim 11, wherein the energy storage mechanism is a flywheel comprising a mechanical device with a significant moment of inertia used as a storage device of a rotational energy.

13. The mammal-powered energy generation and transmission system of claim 12, wherein the mechanical device is configured to resist a change in a rotational speed to steady a rotation of a shaft when a fluctuating torque is exerted on the mechanical device by the mammal-operator serving as a power source, thereby maximizing the mammal-powered energy output efficiency.

14. The mammal-powered energy generation and transmission system of claim 13, wherein the set of silicon nanowires and the frame has a thermoelectric conversion efficiency of at least 3ZT.

15. The mammal-powered energy generation and transmission system of claim 11, wherein the energy storage mechanism is an electric double-layer capacitor to provide an energy smoothing in a momentary-load condition of the mammal-powered energy generation and transmission system.

16. The mammal-powered energy generation and transmission system of claim 11, wherein the energy storage mechanism is a thin metal film battery utilizing a thin-film printing technology that applies a solid-state lithium polymer through a deposit mechanism directly onto an integrated circuit of the exercise apparatus.

17. The mammal-powered energy generation and transmission system of claim 11, wherein the heat of the exercise apparatus and the mammal-operator are captured through the electricity generation mechanism through a thermal diode having an efficiency of at least 40 percent of a Carnot Limit of a maximum efficiency through a reduction of a separation between a hot surface and a conversion device of the exercise apparatus.

18. A method comprising:
mechanically displacing a movable object of an exercise apparatus when a mammal applies a force upon the movable object;

generating an electrical energy based on a displacement of the movable object and based on at least one of heat generated by the mammal and heat due to friction based on work done on the exercise apparatus;

capturing the electrical energy in a battery;

electrically transferring the electrical energy stored in the battery to an intelligent electrical network; and capturing at least one of the heat generated by the mammal and the heat due to friction through at least one of a thermal diode and a silicon nanowire embedded in a frame of the exercise apparatus.

19. The method of claim 18, further comprising:
calculating an energy generation statistic of the mammal applying the force on the movable object; and displaying the energy generation statistic on the exercise apparatus, wherein the energy generation statistic is a quantity of electrical power generated by the mammal operating the exercise apparatus, and wherein a mechanical displacement of the movable object is associated with a normal operation of the exercise apparatus.

* * * * *